United States Patent [19]
Kato

[11] 3,979,925
[45] Sept. 14, 1976

[54] SHAFT-COUPLING DEVICE PREVENTABLE FROM OVER-TORQUE TRANSMISSION

[76] Inventor: Taizo Kato, 177-3, Minatoyamacho, Hyogoku, Kobe, Japan

[22] Filed: Mar. 7, 1974

[21] Appl. No.: 449,094

Related U.S. Application Data

[62] Division of Ser. No. 291,600, Sept. 25, 1972, Pat. No. 3,827,260.

[52] U.S. Cl. .................................. 64/29; 64/30 R; 81/52.4 A; 192/56 R
[51] Int. Cl.² ............................................ F16D 3/56
[58] Field of Search ................ 64/29, 30 R; 81/52.4; 192/56 R

[56] References Cited
UNITED STATES PATENTS

| | | |
|---|---|---|
| 2,668,426 | 2/1954 | Hoover .................................. 64/29 |
| 2,882,704 | 4/1959 | Quackenbush ......................... 64/29 |
| 3,552,147 | 1/1971 | Johansson et al........................ 64/29 |
| 3,693,381 | 9/1972 | McGee ................................... 64/29 |

Primary Examiner—Samuel Scott
Assistant Examiner—Randall Heald
Attorney, Agent, or Firm—Armstrong, Nikaido & Wegner

[57] ABSTRACT

A mechanical shaft-coupling device fitted with at least one steel ball, inserted at the coupling part of driving and driven shafts, engages with both the driving and driven shafts under normal load to transmit normal torque but, shifts its position to cut the transmission with the driven shaft in over-loaded condition so that the driving shaft idles and no over-torque works on the driven shaft.

2 Claims, 14 Drawing Figures

Fig. 5
Fig. 6
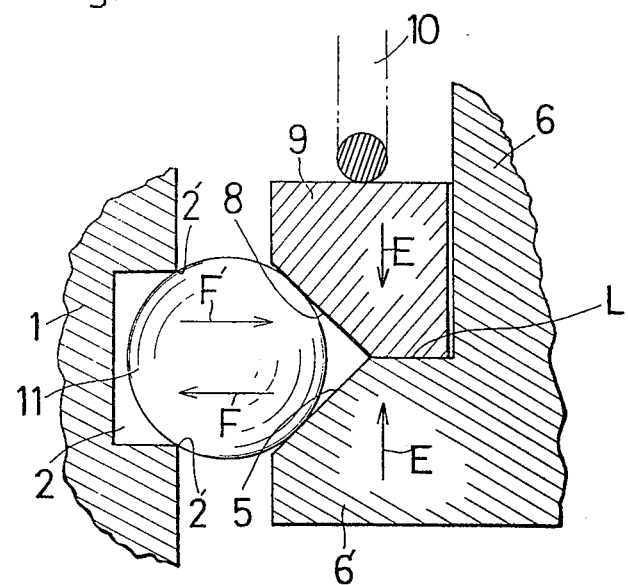
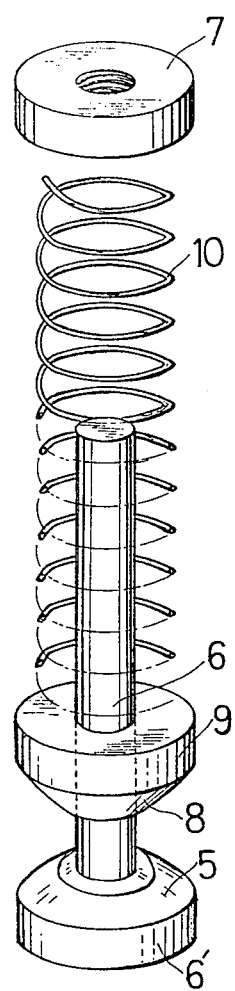
Fig. 7
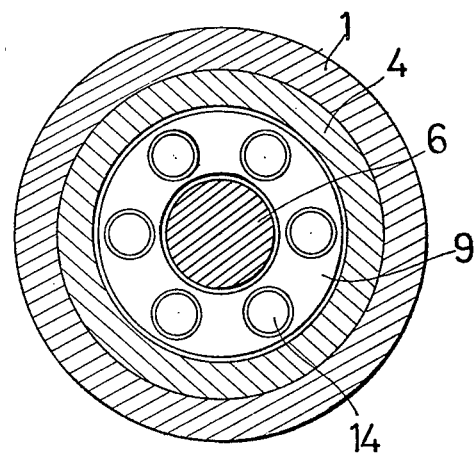

SHAFT-COUPLING DEVICE PREVENTABLE FROM OVER-TORQUE TRANSMISSION

This is a division, of application Ser. No. 291,600, filed Sept. 25, 1972.

BACKGROUND OF DISCLOSURE

The present invention relates to a mechanical shaft-coupling device for coupling a driving shaft connected to a motor with a driven shaft connected to its load.

It has been observed that in mechanical manipulation by use of rotating tools over-load in the manipulation leads to over-torque given to such tools, which become disfigured and unusable or else broken and scattered thereby menacing the operational safety.

With a view to prevent such a dangerous accident, it is desirable to hold the rotating tool not by the driving shaft directly but by the driven shaft coupled with the driving shaft by a shaft-coupling device, which transmits normal torque under normal load but stops its torque transmission as soon as the revolving tool becomes overloaded, and furthermore it is desirable to make the shaft-coupling device resume its normal function as soon as the revolving tool comes back to the normal load condition.

The desirable shaft-coupling devices of the prior art, such as fluid couplings or electro-magnetic couplings, have apparent disadvantageous points such as their complicated mechanism, troublesome handling and expensiveness. Because of this fact, a shaft-coupling device with comparatively simple mechanism has been called for.

As a means of satisfying the above conditions, there has been used such a mechanical shaft coupling device as resiliently-supported gear clutch type, comprising a clutch disc being equipped with partial concave radial fosses reaching the circumference of the disc and having side walls inclined circumferentially and opened toward the other clutch disc being equipped with corresponding partial projections to engage the fosses, and the projections being supported resiliently by plate springs.

Under normal load given to the driven shaft, the projections are pressed by the spring plates so that the projections engage with the faces for normal torque transmission, while if the driven shaft comes to take an overloaded condition, the axial component force of the torque applied to the inclined sides of the fosses and projections wins over the spring plate's resilient force, whereby the coupled faces and projections disengage to cut the torque transmission.

However, this mechanical shaft-coupling device of the prior art, when the driven shaft is under overload, makes the driven shaft turn idlingly rubbing the clutch disc with considerable pressure equivalent to the repelling power of the spring plate compressed through disengagement of the coupling device, with the result that the tips of the projections and the inclined side walls of the faces sustain rapid frictional wear. This wear, therefore, rapidly changes the shape of inclined contact surface of the projections and faces, the inclined angle becoming less and the torque limit for disengaging the coupling dropping in a short time. Not only the initially-presecribed torque limit can not be maintained as it is, but it also becomes entirely impossible even to transmit the normal torque.

SUMMARY OF THE INVENTION

A purpose of the present invention is to overcome all the aforementioned disadvantages common to shaft-coupling devices of the prior art by providing a novel and improved mechanical shaft-coupling device coupling the driving shaft with the driven shaft.

This shaft-coupling device of the present invention has a driving shaft of which cylindrical pipe end embraces the co-axial cylinder end of a driven shaft with a radial cylindrical slit between the two shafts, several steel balls inserted and seated across said slit, and two wedge rings, having a synmetrical inclined side wall each to come in contact with the balls thus holding the balls radially and at the same time being pressed in the axial direction by the resilient force of the coil spring. Now, when the driven shaft, under normal load, is within the prescribed torque limit, the coil spring is found resiliently pressing the adjacent wedge rings, which hold the steel ball by the ring's inclined side walls, the ball being engaged both with the driving and driven shafts. Thereby transmitting the torque of the driving shaft to the driven shaft.

Then, when the driven shaft comes under overload beyond the prescribed load limit, the overload torque of the driven shaft causes the inclined side walls of the wedge rings to be forcibly pressed by the steel ball, wherein said steel ball shifts its position radially and plunged with force in-between the rings to disengage itself from the former coupling position to another position received only by either one of the shafts under recilient pressure of the spring. This shifting of the steel ball cuts the transmission of revolving torque of the driving shaft, making the driven shaft idle, thereby eliminating a danger of overload torque being transmitted to the driven shaft and preventing revolving tools from being bent or broken into pieces.

Further, when the cause of overload is removed from the then overloaded driven shaft and the normal load condition is restored, the decrease in the driven shaft's load torque also decreases the contacting pressure of the steel balls against the inclined side walls of the wedge rings, whereby said wedge rings are pressed by the coil spring to push the steel ball back to its normal position and hold it thereat, the ball thus being engaged with both the driving and driven shafts. Accordingly this change causes the steel ball to transmit the normal revolving torque from the driving shaft over to the driven shaft. In this way, the shaft-coupling device in accordance with the present invention is designed to transmit only the normal torque below the prescribed torque limit and cuts the transmission while the driven shaft is under overload as a safety device to protect the revolving tool connected thereto.

Furthermore, the device according to the present invention is designed so as to make the steel ball, under the driven shaft's overload, rotatably move radially as it presses itself, with the reactionary pressure to the resilient sustaining strength of the spring given to the ball through the wedge ring, against the driven shaft without slidably moving at the relative osculating surface of the driven shaft. As the ball can only roll on said osculating surface with no unnecessary contacting pressure, thereby minimizing its wear. Similarly, the ball, presently contacting the inclined side-wall of the wedge ring, does not slidably move on said side-wall in contact but merely roll, bearly being subjected to frictional wear. Therefore, this device can be used due to its sturdy nature explained above for a period much longer than that of the conventional make which is subjected to extreme wear because of its sliding friction under pressure, and it also assures, by its special character, to steadily maintain its ability without failure its function in relation to the initially prescribed torque limit, adding to the reliability of the device. Further, the device according to the present invention can minutely adjust by an adjusting screw, the length of the coil spring which resiliently support the steel ball through the wedge ring, being capable of delicately changing the condition for resiliently holding the steel ball in ballance very easily and of adjusting, in the same delicate way, the prescribed torque valve which functions as a means of safety.

Also, the steel ball is resiliently held in a position in contact with the inclined side-walls of the wedge rings, said side-walls amplifying the coil spring's resilient force. Therefore it is possible to utilize coil springs and others with particular special resiliency features for the present device without resorting to powerful plate springs of the prior art which directly works on the coupling mechanism. Also possible is to adjust extensively the prescribed torque value as the safety device merely by simple replacing the wedge rings having side walls of various inclined degrees in order to greatly change aforementioned ballance in holding the steel ball.

Also with this shaft-coupling device, having a radial slit between the matched sides of the driving shaft pipe end and the driven shaft end where the steel ball works intermediately, said slit, if the size therof is changed, can change the intermediate condition of the steel ball inserted in-between, thereby obtaining extensive changes in the effciency in torque transmission. Therefore, by replacing the driven shaft with another having different diameter, the prescribed safety torque value may be greatly changed.

BRIEF DESCRIPTION OF THE DRAWINGS

Other objects, features and advantages of the present invention will become apparent from a study of the following description of preferred embodiments with the accompanying drawings, in which;

FIG. 5 is a perspective view showing segmental parts, including the wedge rings and the coil spring, of the same shaft-coupling device.

FIG. 6 is a fractional enlarged cross-sectional side view showing the steel ball setting in the same shaft-coupling device.

FIG. 7 is a transverse cross-sectional plane view showing another arrangement of the coil springs in the same shaft-coupling device.

DETAILED DESCRIPTION

Figure 1:
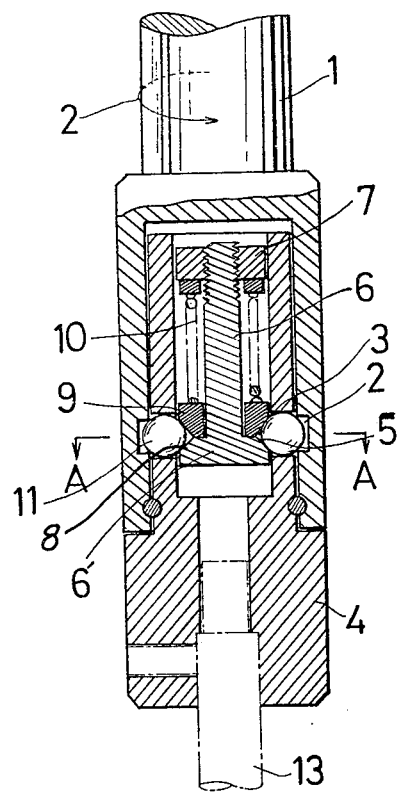
FIG. 1 is a longitudinal cross-sectional side view of a shaft-coupling device in normal loaded condition according to a preferred embodiment.

Referring now to the drawings, the present invention is further illustrated by the following examples. Of course, this invention shall not be limited to the following examples.

EXAMPLE 1

As shown in FIG. 1 to 7, a driving shaft 1 has appropriate given number of concave releases on the inner cylindrical wall of its pipe end, and a driven shaft end having penetrating holes thereon at the positions corresponding to said recesses of the driving shaft pipe end is slidally fitted to the follow of said driving shaft pipe end. A bolt 6 at the driven shaft end hollow has its head 6' equipped with a side wall 5 inclined towards the driving shaft, and is fitted with a movable wedge ring 9 having an inclined side wall 8 adjacent to the inclined side wall 5. Said wedge ring 9 is mounted in-between the bolt head 6' and a bottom nut 7 and is pressed against the bolt head 6' by a coil spring 10. A washer may also be inserted between the nut 7 and the spring. The ball 11, of a diameter bigger than the thickness of the drivenshaft cylindrical pipe, is fitted to the recess 3 without engagement and comes into contact with the inclined side walls 5 and 8 at the part of the ball protruding into the driven shaft clyindrical end.

As the coil spring's force constantly presses the wedge ring 9 and the bolt head 6' against each other with pressure E, the steel ball 11 under the pressure E in turn presses the inner cylindrical wall of the driving shaft 1 with outgoing force F. This force F, determined by the pressure E and the inclined angle of the side walls 5 and 8, can be adjustable by changing the matched relative position of the bolt 6 and the nut 7 or by changing the angle of the inclined side walls 5 and 8. The former adjustment can be made before the shaft-coupling device body is assembled, while the latter method is possible by replacing the presently-used bolt 6 and wedge ring 9 with any one of the other several set with different angles of the inclined side walls 5 and 8. The above adjustment may be easily made as occasions demand either extensively or delicately.

Figure 2:
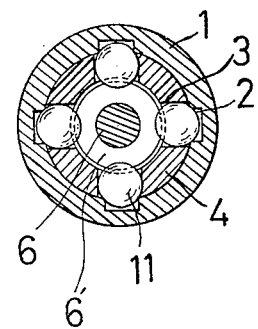
FIG. 2 is a transverse cross-sectional plane view at the line A—A in the FIG. 1.
Figure 3:
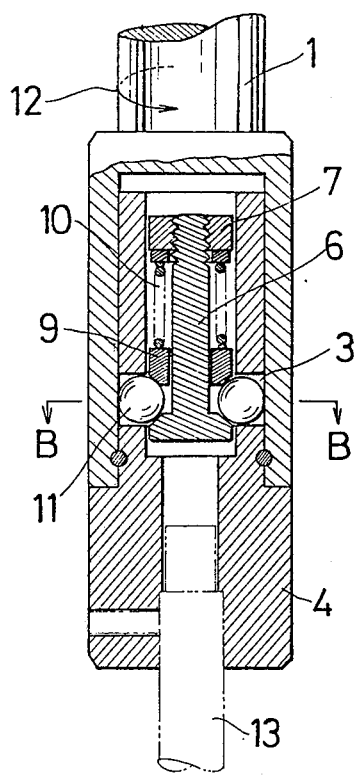
FIG. 3 is a longitudinal cross-sectional side view of the same shaft-coupling device in over-loaded condition.
Figure 4:
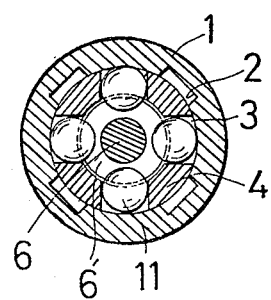
FIG. 4 is a transverse cross-sectional plane view at the line B—B in the FIG. 3.

As described above, the steel ball 11, constantly presses the driving shaft 1 with the prescribed force F, thereby protruding from the penetrating hole 3 into the recess 2 with force F when, as shown in FIGS. 1 and 2, the recess 2 and the penetrating hole 3 are positioned correspondingly. As illustrated in FIG. 6, the wedge ring 9 and the bolt head 6' can be designed to come into contact at F line L when the steel ball 11 engages the recess 2, whereby the pressing point 2' of the steel ball 11 against the recess 2 or the pressing part of the steel ball against the inclined side walls 5 and 8 does not received any more force than is really needed, thereby lessening frictional ware at the places mentioned.

The driving shaft 1, in this state, being turned axially, its torque is transmitted to the driven shaft 4 through the recess 2, steel ball 11 and penetrating hole, whereby the cutting tool 13 connected to the driven shaft can do one required cutting work. In case the tool meets any resistance beyond the prescribed value in due course of manipulation, the force of the driven shaft 4 to stop its revolution runs against that of the driving shaft 1 to continue its revolution, whereby the steel ball 11 is given inward force F' which, if stronger than the outward force F, pushes the steel ball 11 to forcibly find its way inbetween the wedge ring 9 and the bolt head 6' and to subsequently plunge into the penetrating hole 3, disengaging itself from the driving shaft 1. The steel ball 11, thus being unable to act as intermediary between the driving and driven shaft, the driven shaft comes to stop its revolution. The driving shaft still continues its revolution, making the steel ball 11 revolve at the same time due to its friction with the inner cylindrical wall of the pipe end of the driving shaft 1. This revolving steel ball 11 in turn causes the bolt 6 and wedge ring 9, all free to turn axially and are made to press the steel ball 11 by their inclined side walls, to revolve co-axially, whereby the contact point between the steel ball 11 and the inclined side walls 5 and 8 constantly changes with the resultant negligible wear coming from the contact thereof, thereby making these parts durable for a long time.

This way, when the cutting tool 13 meets the resistance prescribed in accordance with the pre-adjusted force F, the driven shaft automatically stops and serves the purpose of safety. Said resistance removed, the steel ball 11, when the recess 2 and the penetrating hole 3 come to the corresponding positions, again jut into the recess 2, whereby the driven shaft 4 can start revolving in unison with the driving shaft 1. The above-mentioned function and effect, even when the driven shaft's 4 relationship with the driving shaft 1 is reversed, stay exactly the same. FIG. 7 shown a plural number of springs 14 in place of the spring 10, the function and effect thereof being similar. As explained above, the wedge ring 9 and the bolt head 6' are used for pressing, at their inclined side walls, the steel ball 11, whereby the inclined angle of the side wall, if changed is capable of delicately adjusting the force P in a wide range. Furthermore, said wedge ring 9 and the bolt head 6' are entirely free from both the driving and driven shafts 1 and 4, and as shown in FIGS. 1 and 6, the steel ball 11 is not given pressure any more than is necessary with resultant characteristic minimum wear of said ball 11 and other parts of the device which come into contact therewith, and longer durability of the cutting tool is also assured.

EXAMPLE 2

Figure 8:
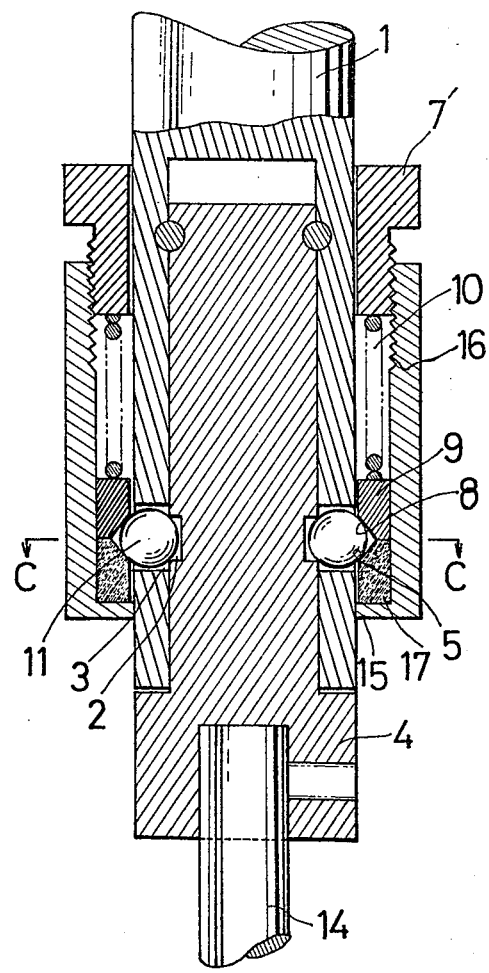
FIG. 8 is a longitudinal cross-sectional side view of another shaft-coupling device, in normal loaded condition, according to another preferred embodiment.
Figure 11:
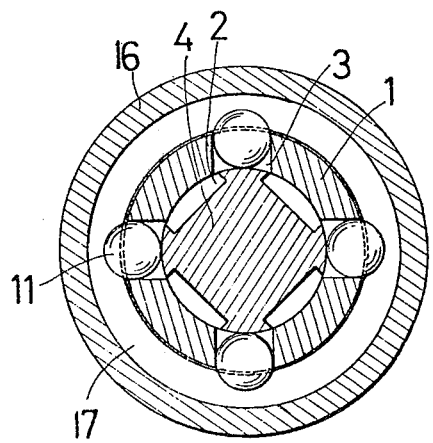
FIG. 11 is a transverse cross-sectional plane view at the line D—D in the FIG. 10.

As shown in FIGS. 8 and 11, the driving shaft 1 has a given number of holes 3 bored on the cylindrical pipe end wall of said driving shaft 1, and the driven shaft 4, equipped with recesses 2 made at the positions corresponding to those of the holes 3, is fitted into the cylindrical hollow of the end pipe of driving shaft 1 so that the driven shaft end 4 can revolve co-axially. A torque-adjusting cylinder 16, having a radial bottom end 15 is fitted idlingly to the outer circumference of the driving shaft 1 and houses a pair of wedge rings 9 and 17, the former having a bottom side wall 8 and the latter a top side wall 5 both inclined toward the driving shaft 1 and in contact with each other is symmetrical positions and can idle or shift their positions axially. The adjusting cylinder 16 further has a nut 7' threaded thereinto at its top for adjusting the torque limit and a coil spring 10 inserted in-between the nut 7' and the wedge ring 9. Each hole 3 is made to house, neutrally, a steel ball 11 larger in diameter than the thickness of the cylindrical pipe wall of the driving shaft land engaging in part with the inclined side walls 5 and 8.

Accordingly, the wedge rings 17 and 9 are given by the coil spring 10 the pressure toward each other, the pressure pressing the steel ball, by way of the inclined side walls 5 and 8, toward the driven shaft 4. The resilient force of the coil spring 10 is adjustable through screwing the nut 7' into or back from the adjusting cylinder 16. Also the pressing force of the steel ball 11 against the driven shaft 4 can be readily changed by means of adjusting the resilient force of the coil spring 10 or providing with other wedge rings of different inclining degree at their side walls.

The steel ball 11, as above-described, constantly pressing the driven shaft 4 with pre-adjusted pressure, engages with the recess 2 when said recess 2 is in a position corresponding to that of the hole 3, wherein the torque of the driving shaft 1 is transmitted, through the hole 3, steel ball 11 and recess 2, to the driven shaft 4 for cutting work.

When the cutting tool 13 meets resistance bigger than this torque, the driven shaft 4 is given a force to stop its revolution, when the driving shaft 1 continues its revolution, whereby the steel ball 11 is given force to push its way off the recess 2. If this force is stronger than the resilient force of the coil spring 10, it compresses the spring coil 10 and pushes open the wedge rings 17 and 9, whereby the steel ball 11 is made to retreat into the hole 3, the connection between the driving shaft 1 and the driven shaft 4 being cut to stop the latter's revolution.

Figure 10:
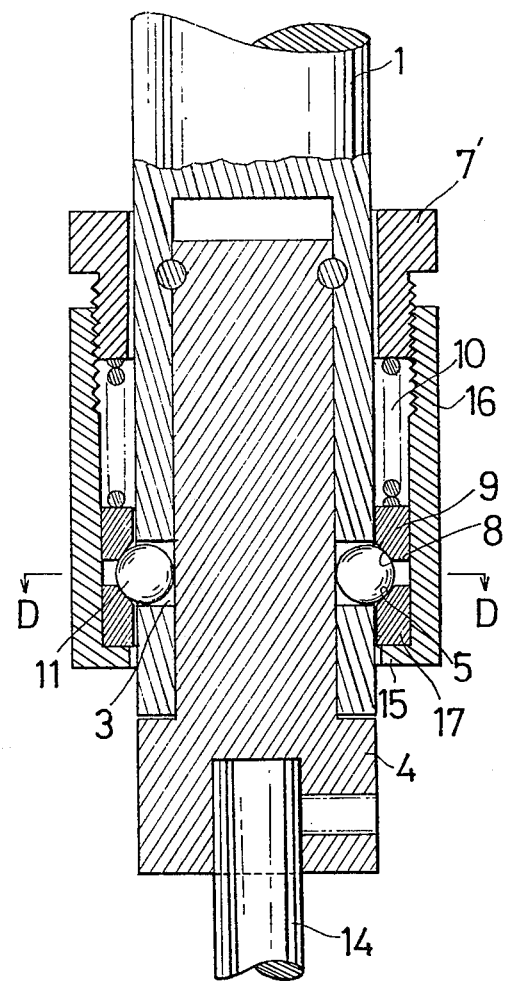
FIG. 10 is a longitudinal cross-sectional side view of the same shaft-coupling device as the FIG. 8, in over-loaded condition.

When the above-noted resistance met by the cutting tool 13 is removed, the steel ball 11 juts out from the hole 3 to the recess 2 as soon as the hole 3 and the recess 2 come to their corresponding positions, the ball thereby being positioned as shown in FIGS. 10 and 11 to turn the driving shaft 1 and the driven shaft 4 co-axially.

EXAMPLE 3

Figure 9:
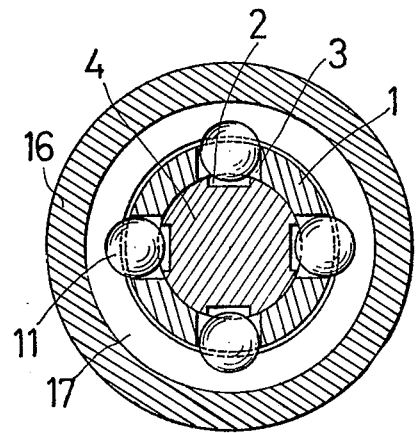
FIG. 9 is a transverse cross-sectional plane view at the line C—C in the FIG. 8.
Figure 12:
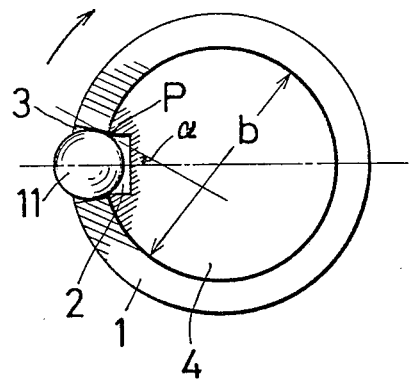
FIG. 12 is a transverse cross-sectional plane view corresponding to the FIG. 9 with a small size radial slit between the driving shaft and the driven shaft.
Figure 14:
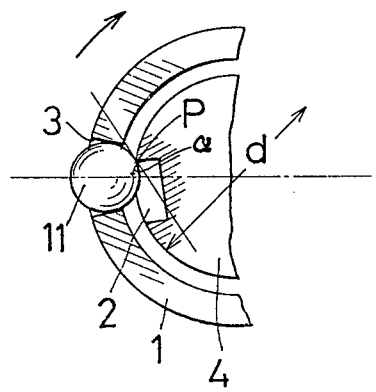
FIG. 14 is a transverse cross-sectional plane view corresponding to the FIG. 9 with a large size radial slit between the driving shaft and the driven shaft.

In accordance with example 2 described above, 3 driven shafts 4, 440 and 4'', having different outer diameter b, c and d at a part of the shaft (including the part corresponding to the hole 3) to be inserted into the cylindrical hollow end of the driving shaft 1, are fitted with the recess 2,— corresponding to the hole 3 as indicated in FIGS. 12 and 14 related respectively to FIGS. 8 and 9. Another alternative may be to use splayed shaft to act in place of the recess. As shown in FIGS. 8 and 9, the driven shaft 4 is inserted into the hollow end of the driving shaft 1 and secured so as not to come off therefrom. In this state, the steel ball 11 is found projecting into the recess as shown in FIGS. 8 and 9 due to the pressing force of the coil spring 10.

Figure 13:
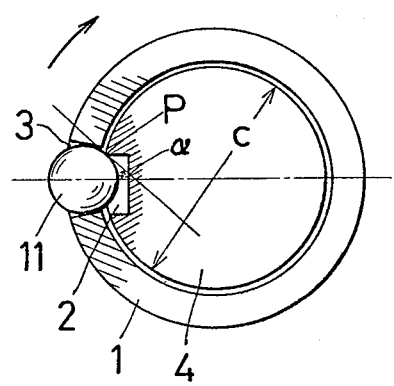
FIG. 13 is a transverse cross-sectional plane view corresponding to the FIG. 9 with a medium size radial slit between the driving shaft and the driven shaft.

Now, when the driving shaft 1 is revolved in the arrowed direction as shown in FIGS. 12, 13 and 14, the torque is transmitted to the driven shaft through the steel ball 1 and the point P of the driven shaft 4 presently in contact with the steel ball 11. The driven shafts 4, 4' and 4'' with respective different outer diameter $b$, $c$ and $d$, when inserted into the cylindrical pipe end of the driving shaft 1, show changes in the angle $a$ formed by the tangent line at the point P and the shaft's center line passing through the center of the steel ball 11 as shown in FIGS. 12, 13 and 14. This angle $a$ changes greatly in geometrical progression because of the spherical shape of the steel ball 11, wherein with the less angle the greater is the torque which can be transmitted.

With a good number of driven shafts as herein described having different diameter, it is possible to easily adjust the torque in a wide range through relacing one with another as necessity demands.

While a few embodiments of the present invention have been illustrated and described in detail, it is readily apparent to those who are skilled in the art that modifications and alterations thereof can be made without deviating from the principles of the present invention set forth in the following claims.

I claim:
1. A shaft coupling device designed to prevent the transmitting of an over-torque, consisting essentially of:
   a driving shaft having a co-axial cylindrical pipe end,
   a driven shaft with a smaller outside diameter than the inside diameter of driving shaft pipe end, said driven shaft being inserted into and coupled rotatably with said driving shaft pipe end,
   a pair of wedge rings having inclined side walls and located in adjacent relationship,
   a cylinder having a bottom portion at one end and fitted co-axially around the outer circumference of said driving shaft,
   at least one steel ball inserted between said driving shaft pipe end and the driven shaft and being urged inwardly by the wedge rings against the driven shaft,
   with said wedge rings being urged toward the ball by at least one spring placed between the wedge ring and an adjustable nut engaging a screw-threaded end of the cylinder,
   wherein said wedge rings are supported rotatably in contact with each ball inside said cylinder end,
   whereby, in a state of normal torque transmission, each steel ball is so positioned as to engage both said driving shaft pipe end and said driven shaft,
   such that while said driven shaft is overloaded, each steel ball is forced to push said wedge rings apart from one another, and having another position such as to engage either one of the said driving shaft pipe end or said driven shaft,
   wherein said driving shaft has a hole for each said steel ball, and through which each said steel ball is movable, and
   wherein said driven shaft has a recess in which each steel ball is received for engagement therewith, and said wedge rings are located between said driving shaft cylindrical pipe end and said cylinder.

2. A shaft coupling device designed to prevent the transmitting of an over-torque, consisting essentially of:
   a driving shaft having a co-axial cylindrical pipe end,
   a driven shaft with a smaller outside diameter than the inside diameter of driving shaft pipe end, said driven shaft being inserted into and coupled rotatably with said driving shaft pipe end,
   a pair of wedge rings having inclined side walls and located in adjacent relationship,
   a cylinder having a bottom portion at one end and fitted co-axially around the outer circumference of said driving shaft,
   at least one steel ball inserted between said driving shaft pipe end and the driven shaft and being urged inwardly by the wedge rings against the driven shaft,
   with said wedge rings being urged toward the ball by at least a spring placed between the wedge ring and an adjustable nut engaging a screw-threaded end of the cylinder,
   wherein said wedge rings are supported rotatably in contact with each ball inside said cylinder end,
   whereby, in a state of normal torque transmission, each steel ball is so positioned as to engage both said driving shaft pipe end and said driven shaft,
   such that while said driven shaft is overloaded, each steel ball is forced to push said wedge rings apart from one another, and having another position such as to engage either one of the said driving shaft pipe end or said driven shaft,
   wherein said driving shaft has a hole for each said steel ball, and through which each said steel ball is movable, and
   wherein said driven shaft has a recess in which each steel ball is received for engagement therewith, and said wedge rings are located between said driving shaft cylindrical pipe end and said cylinder with said driven shaft being exchangeable to various sizes of outside diameter thereof so as to change the radial aperture being formed between said driving shaft pipe end and said driven shaft.

* * * * *

UNITED STATES PATENT OFFICE
CERTIFICATE OF CORRECTION

Patent No. 3,979,925                Dated September 14, 1976

Inventor(s) Taizo Kato

It is certified that error appears in the above-identified patent and that said Letters Patent are hereby corrected as shown below:

Column 3, line 14:   change "valve" to -- value --;

Column 4, line 24:   change "release" to -- recess --;

line 28:   change "follow" to -- hollow --;

line 65:   change "F" to -- the --;

Column 5, line 59:   change "and" to -- to --;

Column 6, line 3:    change "is" to -- in --;

line 10:   change "land" to 1 and --;

line 51:   delete ", 440 and 4''''";

line 56:   change "and" to -- to --;

Column 7, line 1:    delete ", 4' and 4''''";

Figure 1: change arrow "2" to -- 12 --.

Signed and Sealed this

First Day of February 1977

[SEAL]

Attest:

RUTH C. MASON
*Attesting Officer*

C. MARSHALL DANN
*Commissioner of Patents and Trademarks*